(12) United States Patent
Chang et al.

(10) Patent No.: US 8,389,639 B2
(45) Date of Patent: Mar. 5, 2013

(54) MODIFIED HYPER-BRANCHED POLYMER AND PROTON EXCHANGE MEMBRANE APPLIED WITH THE SAME, AND METHOD FOR MANUFACTURING THE PROTON EXCHANGE MEMBRANE

(75) Inventors: Chung-Liang Chang, Hsinchu (TW); Ya-Ting Hsu, Bade (TW); Jing-Pin Pan, Zhudong Town, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 556 days.

(21) Appl. No.: 12/623,642

(22) Filed: Nov. 23, 2009

(65) Prior Publication Data

US 2011/0033773 A1 Feb. 10, 2011

(30) Foreign Application Priority Data

Aug. 4, 2009 (TW) .................. 98126173 A (51) Int. Cl.
*C08F 273/00* (2006.01)
*C08F 269/00* (2006.01)
*C08F 267/10* (2006.01)

(52) U.S. Cl. .......... 525/291; 429/483; 427/115; 521/30; 521/33; 524/100; 525/326.7; 525/326.8; 525/327.5; 525/327.6; 525/331.9; 525/332.1; 525/332.6; 525/343; 525/418; 525/419; 525/540; 526/258; 526/260; 526/263; 977/754

(58) Field of Classification Search ............... 429/483; 427/115; 521/30, 33; 524/100; 525/291, 525/326.7, 326.8, 327.5, 327.6, 331.9, 332.1, 525/332.6, 343, 418, 419, 540; 526/258, 526/260, 263; 977/754
See application file for complete search history.

(56) References Cited

U.S. PATENT DOCUMENTS

| | | | |
|---|---|---|---|
| 6,172,180 B1 * | 1/2001 | Hancock et al. | 528/391 |
| 6,258,896 B1 * | 7/2001 | Abuelyaman et al. | 525/437 |
| 2008/0160405 A1 * | 7/2008 | Yang et al. | 429/215 |
| 2008/0160418 A1 * | 7/2008 | Pan et al. | 429/328 |
| 2008/0221325 A1 | 9/2008 | Pan et al. | |

FOREIGN PATENT DOCUMENTS

TW 200827026 7/2008

OTHER PUBLICATIONS

English Abstract translation of TW200827026 (Published Jul. 1, 2008).
TW Office Action dated Jan. 11, 2013.

* cited by examiner

*Primary Examiner* — Robert C Boyle
(74) *Attorney, Agent, or Firm* — McClure, Qualey & Rodack, LLP (57) ABSTRACT

A proton exchange membrane comprising modified hyper-branched polymer is disclosed. The proton exchange membrane includes 85-90 wt % of sulfonated tetrafluorethylene copolymer and 15-10 wt % of modified hyper-branched polymer. The modified hyper-branched polymer comprises the bismaleimide (BMI)-based hyper-branched polymer, and parts of the chain ends of the hyper-branched polymer are sulfonated by the sulfonic compound. Also, the modified hyper-branched polymer and sulfonated tetrafluorethylene copolymer are interpenetrated to form an interpenetrating polymer. Furthermore, the modification step could be performed before or after forming the interpenetrating polymer. For example, the sulfonation is proceeded after forming the interpenetrating polymer. Alternatively, the sulfonation of the hyper-branched polymer could be proceeded before the formation of the interpenetrating polymer.

8 Claims, 4 Drawing Sheets

Linear ionomer    Hyper-branched polymer

Interpenetrating polymer

MODIFIED HYPER-BRANCHED POLYMER AND PROTON EXCHANGE MEMBRANE APPLIED WITH THE SAME, AND METHOD FOR MANUFACTURING THE PROTON EXCHANGE MEMBRANE

This application claims the benefit of Taiwan application Serial No. 98126173, filed Aug. 4, 2009, the subject matter of which is incorporated herein by reference.

BACKGROUND OF THE INVENTION

1. Field of the Invention

The invention relates in general to a modified hyper-branched polymer and proton exchange membrane applied with the same and method for manufacturing the proton exchange membrane, and more particularly to the modified hyper-branched polymer which has improved dimensional stability and high proton transporting rate at low humidity, and method for manufacturing the same.

2. Description of the Related Art

Nafion® (sulfonated tetrafluorethylene copolymer) is a conductive polymer developed by Dupont in the 1960's. This compound is also called ionomer due to its ionic property. Nafion has the unique quality of being microphase separated into hydrophobic and hydrophilic domains composed of backbone rich and sulfonic acid side chain rich regions respectively. The ionic property of Nafion comes from the sulfonic acid moiety (side chains) grafted on the terminals of the polytetrafluoroethylene (backbone). Because of great thermal stability and mechanical durability, Nafion has attracted extensive interest and became one of important materials studied by the researchers related to the technology of the Proton Exchange Membrane Fuel Cells (PEMFC).

Protons from the sulfonic acid moiety of Nafion are able to transfer from one sulfonic acid to another for proton exchange. However, electrons and anions (negatively charged ions) of Nafion cannot be transferred between the sulfonic acids as protons.

Although Nafion has many advantages, it shows considerable dimensional changes after heat treatment. U.S. Pat. No. 4,983,690 to Cameron et al. discloses a conductive polymer blend of Nafion and bismaleimide, and method of producing the same, for improving the mechanical properties of the produced Nafion-based membrane. Unfortunately, however, it had been proved by the experiments that the membrane made by the polymer blend disclosed by Cameron couldn't solve the problem of dimensional changes effectively. Moreover, proton transfer/transport is also an important factor to be considered when Nafion-based membrane is adopted for being the proton exchange membrane of the fuel cell. It had been proved that the proton transporting rate in the polymer blend of Nafion and bismaleimide is lower than that in Nafion.

Accordingly, it would be desirable to develop a novel material with excellent properties of great dimensional stability and high proton transporting rate, particularly high proton transporting rate at low humidity.

SUMMARY OF THE INVENTION

It is therefore an object of the invention to provide a modified hyper-branched polymer and proton exchange membrane applied with the same and method for manufacturing the proton exchange membrane. The modified hyper-branched polymer includes the bismaleimide (BMI)-based hyper-branched polymer, which parts of the chain ends are sulfonated. The modified proton exchange membrane manufactured according to the embodiment of the invention exhibits the characteristics of excellent dimensional stability and significantly high proton transporting rate at the low humidity.

The invention achieves the objects by providing a proton exchange membrane, comprising 85 to 90, by weight, of a sulfonated tetrafluorethylene copolymer; and 15 to 10, by weight, of a modified hyper-branched polymer comprising a bismaleimide (BMI)-based hyper branched polymer. Parts of the chain ends of the BMI-based hyper branched polymer are sulfonated to form the modified hyper-branched polymer. The sulfonated tetrafluorethylene copolymer and the modified hyper-branched polymer interpenetrate each other.

The invention achieves the objects by providing a method for manufacturing a proton exchange membrane. First, a bis-maleimide (BMI)-based hyper-branched polymer is formed. Also, a sulfonated tetrafluorethylene copolymer solution with a solvent of dimethyl acetamide (DMAc) is prepared. Then, 10 to 15, by weight, of the BMI-based hyper-branched polymer is added into 90 to 85, by weight, of the sulfonated tetrafluorethylene copolymer solution, and a mixture thereof is stood still and heated to about 50° C., so that the BMI-based hyper-branched polymer and sulfonated tetrafluorethylene copolymer are interpenetrated each other to form a solution of interpenetrating polymer. A solution of sulfonic compound with double bonds is provided. Subsequently, 0.5 to 1, by weight, of the sulfonic compound with double bonds is added into 99.5 to 99, by weight, of the solution of interpenetrating polymer, a mixture thereof is stood still at room temperature for grafting the sulfonic compound on parts of the chain ends of the BMI-based hyper-branched polymer to form a solution containing interpenetrating modified hyper-branched polymer. Then, the solution containing interpenetrating modified hyper-branched polymer is coated on a substrate followed by baking, and then a pre-treatment step is performed to remove DMAc residue, thereby forming the proton exchange membrane.

Furthermore, the modification step could be performed before or after forming the interpenetrating polymer. For example, the sulfonation is proceeded after forming the interpenetrating polymer. Alternatively, the sulfonation of the hyper-branched polymer could be proceeded before the formation of the interpenetrating polymer.

Other objects, features, and advantages of the invention will become apparent from the following detailed description of the preferred but non-limiting embodiments. The following description is made with reference to the accompanying drawings.

DETAILED DESCRIPTION OF THE INVENTION

In the present invention, a modified hyper-branched polymer and a proton exchange membrane applied with the same and a method for manufacturing the proton exchange membrane are provided. The proton exchange membrane made by the modified hyper-branched polymer of the present invention possesses great properties such as improved dimensional stability and high proton transporting rate. Also, the proton transporting rate of the membrane is still high when the relative humidity is decreased.

Figure 1:
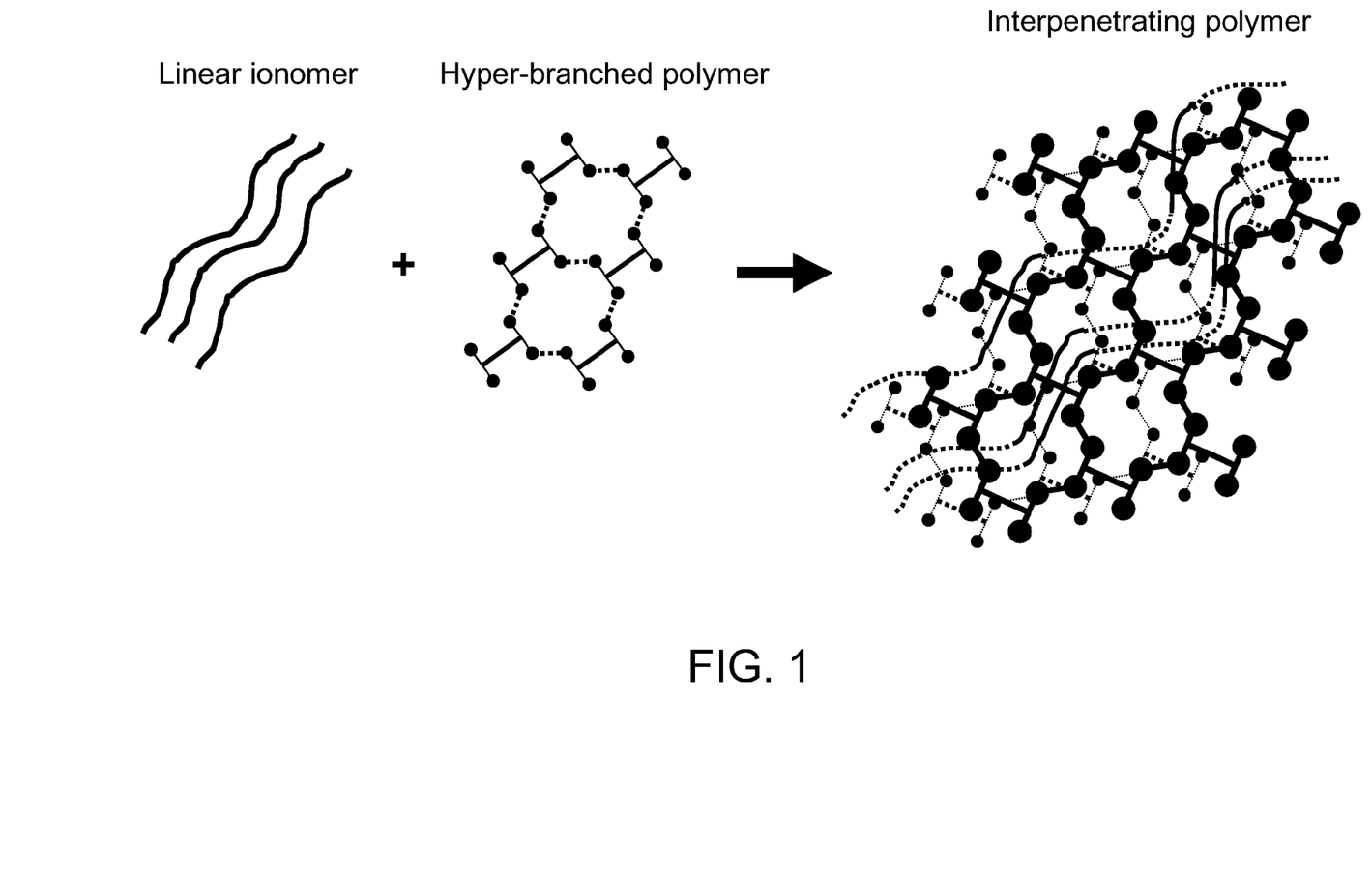
FIG. 1 schematically illustrates an interpenetrating polymer formed by hyper-branched polymer and linear ionomer, wherein the interpenetrating polymer has not been modified.

FIG. 1 schematically illustrates an interpenetrating polymer formed by hyper-branched polymer and linear ionomer, wherein the interpenetrating polymer has not been modified. In FIG. 1, the hyper-branched polymer and the linear ionomer interpenetrate each other.

The modified hyper-branched polymer of the embodiment of the invention is developed by grafting the functional groups which are able to release protons (not shown in FIG. 1) on the chain ends of the hyper-branched polymer, followed by blending this modified hyper-branched polymer with linear ionomer to form a modified interpenetrating polymer. This modified interpenetrating polymer has a woven structure, enabling improved dimensional stability. Also, the functional groups for modification grafted on the chain ends of the hyper-branched polymer are capable of releasing protons, enabling increased proton transporting rate. Thus, the proton exchange membrane made by the modified hyper-branched polymer of the present invention achieves the objective of great dimensional stability and high proton transporting rate, even at low humidity.

It is noted that the step of modification could be performed before or after forming the interpenetrating polymer, and the invention has no limitation thereto. In an embodiment, the hyper-branched polymer could be modified (ex: sulfonated) first, and then interpenetrated with linear ionomer to form a modified interpenetrating polymer. Alternatively, the hyper-branched polymer could be interpenetrated with linear ionomer first (to form a unmodified interpenetrating polymer), and the then modified with the particular functional groups (ex: sulfonic groups) which would search the chain ends of the hyper-branched polymer spontaneously to complete the modification.

According to the present invention, the modified hyper-branched polymer is a bismaleimide (BMI)-based hyper-branched polymer, and the chain ends of the hyper-branched polymer are partially sulfonated to modify the hyper-branched polymer, which the sulfonation is proceeded before or after the interpenetration between the hyper-branched polymer and the linear ionomer. The sulfonation could be performed by using the monomers with sulfonate (SO3-). An embodiment is disclosed herein for illustrating the present invention, but not for limiting the scope of the present invention. Additionally, the drawings used for illustrating the embodiment and applications of the present invention only show the major characteristic parts in order to avoid obscuring the present invention. Accordingly, the specification and the drawings are to be regard as an illustrative sense rather than a restrictive sense.

According to an embodiment of the invention, the modified hyper-branched polymer is formed by copolymerizing bismaleimide (BMI) and barbituric acid, which parts of chain ends are sulfonated by the monomers with sulfonate (SO3-), such as sulfonic compounds with double bonds.

Bismaleimide (BMI) is represented by the formula (1):

(1)

Wherein $R_1$ is selected from the group consisting of

Barbituric acid is represented by the formula (2):

(2)

Wherein each of $R_2$ and $R_3$ is independently selected from the group consisting of hydrogen, methyl, phenyl, isopropyl, isobutyl and isopentyl.

Examples of monomers with sulfonate (SO3-) which can be employed for modifying the chain ends of the hyper-branched polymer are as follows:

CH2=CH—R—SO3Na

CH2=CF—R—SO3Na

OH—R—SO3Na

Wherein R is selected from the group consisting of —(CH2)x-, —(C6H4)-, —(C6H4)-(CH2)x-(C6H4), —CH2-(C6H4)-CH2- and —CH2-(CF2)-CH2-, x is an integer equal or larger than 1.

In one of embodiments of the invention, the sulfonation on the chain ends of the hyper-branched polymer is performed by using sodium 4-vinylbenzenesulfonate, which has double bonds and is represented by the formula:

In another embodiment, of the invention, the sulfonation on the chain ends of the hyper-branched polymer is performed by using 2-Methyl-2-propene-1-sulfonic acid sodium slat, which also has double bonds and is represented by the formula:

An exemplifying method for manufacturing the proton exchange membrane applied with the modified hyper-branched polymer of the embodiment is provided as below. However, illustrations of the following example, such as compounds and reaction steps, are provided for illustrative purposes only and in no way intended to limit the scope of the present invention.

EXAMPLE

Method for Manufacturing Proton Exchange Membrane

In the method for manufacturing the proton exchange membrane provided in Example, a hyper-branched polymer is formed by copolymerizing bismaleimide (BMI) and barbituric acid, and the chain ends of the hyper-branched polymer are sulfonated by sodium 4-vinylbenzenesulfonate to form a modified hyper-branched polymer. The proton exchange membrane of Example is prepared by a process comprising the following procedures.

Forming a BMI-Based Hyper-Branched Polymer

First, the bismaleimide (BMI) and the barbituric acid with an adequate molar ratio are added into y-butyrolactone, and then heated at 130° C. for about 4 hours to form a hyper-branched polymer (BMI-based). The BMI and the barbituric acid are represented in the formulas (1) and (2), respectively. Preferably, the molar ratio of the BMI to the barbituric acid is in a range of about 10:1 to 1:1.

In one embodiment, the monomers of the hyper-branched polymer could further comprise the mono-maleimide and/or the multi-maleimide besides the bismaleimide and the barbituric acid. Examples of the mono-maleimide include N-phenylmaleimide, N-cyclohexylmaleimide, and the likes. Examples of the multi-maleimide include tri-(4-phenylmaleimide)amine, poly(tolylmaleimide), and the likes. In one embodiment, a molar ratio of the BMI to "the multi-maleimide and/or mono-maleimide" is in a range of about 99:1 to 1:1.

Preparing a Sulfonated Tetrafluorethylene Copolymer Solution, with a Solvent of Dimethyl Acetamide (DMAc)

The solvent of a sulfonated tetrafluorethylene copolymer aqueous solution (commercially available from DuPont as Nafion®) is replaced by dimethyl acetamide (DMAc). This solvent-replacing step could be performed by adding a high boiling point solvent DMAc to the Nafion aqueous solution, and then the mixture is heated to vaporize the water.

Preparing a Solution Containing an Interpenetrating Polymer

Subsequently, the hyper-branched polymer is added to the Nafion DMAc solution, and the mixture is stood still and heated to about 50° C. so that the hyper- branched polymer and sulfonated tetrafluorethylene copolymer (Nafion) are interpenetrated each other to form an interpenetrating polymer. The ratio, by weight, of the hyper-branched polymer and Nafion is about 10-15: 90-85. The inter-penetrating degree of the hyper-branched polymer and Nafion could be determined by the transparency of the mixture. Higher transparency of the mixture indicates the higher degree of interpenetration. Lower transparency of the mixture, or an opaque mixture visibly observed, indicates the lower or very small degree of interpenetration. It is noted that the heating step is preferably performed while the mixture is completely stood still. Other mixing methods such as stirring or supersonic vibration would not facilitate the formation of the interpenetrating polymer, and are not suggested in the method of the embodiment. A proton exchange membrane manufactured using the interpenetrating polymer with low degree of interpenetration has poor dimensional stability.

Providing a solution of sulfonic compound

Afterwards, a solution of the sulfonic compound such as with double bonds is prepared, to provide the monomers for modifying the chain ends of the hyper-branched polymer. Examples of the sulfonic compound include CH2=CH—R—SO3Na;

CH2=CF—R—SO3Na; and

Wherein R is selected from the group consisting of —(CH2)x-,

OH—R—SO3Na. —(C6H4)-, —(C6H4)-(CH2)x-(C6H4), —CH2-(C6H4)-CH2- and —CH2-(CF2)-CH2-, x is an integer equal or larger than 1.

The sulfonic compound used in this Example is sodium 4-vinylbenzenesulfonate, which has double bonds and is represented by the formula:

Performing Sulfonation on Parts of the Chain Ends of the Hyper-Branched Polymer

A solution containing interpenetrating modified hyper-branched polymer is prepared by adding 0.5-1, by weight, of sodium 4-vinylbenzenesulfonate (i.e. the sulfonic compound having double bonds) into 99.5-99.0, by weight, of the solution of interpenetrating polymer, and stood still on the bench at the room temperature for about 24 hours, for grafting sodium 4-vinylbenzenesulfonate on parts of the chain ends of the hyper-branched polymer for modification. Then, sodium ions (Na+) of this solution containing interpenetrating modified hyper-branched polymer are replaced by hydrogen ions (H+) using the sulfuric acid treatment. It is noted that the modification step is performed while the mixture is completely stood still on the bench, and no extra mixing method such as stirring or supersonic vibration is required/suggested.

Performing Pre-Treatment and Forming a Proton Exchange Membrane

Afterward, the solution containing interpenetrating modified hyper-branched polymer is coated on the surface of a substrate, baked at 130° C., and then subjected to a pre-treatment step. In an embodiment, the pre-treatment step is performed by removing the film from the substrate and then immersing the film in the water ($H_2O$), 3% $H_2O_2$, $H_2O$, 0.5M $H_2SO_4$ and $H_2O$ for about an hour, respectively. DMAc residue can be effectively removed by conducting the pre-treatment step. Compared to a membrane without pre-treated, a proton exchange membrane which is formed with pre-treated and has no DMAc residue would have much better results of conductivity and dimensional stability at the increasing temperatures. The proton exchange membrane provided in the aforementioned embodiment and Example is well-suited for use in a fuel cell, which can be referred to as a proton exchange membrane fuel cell.

Also, it has been proved by the experiments that the modified proton exchange membrane according to the embodiment has higher conductivity (i.e. higher proton transporting rate) and better dimensional stability than the Nafion membrane (commercially available from DuPont), even at low humidity.

It is noted that the modified proton exchange membrane in Example is manufacture by forming the interpenetrating polymer before performing the modification (i.e. sulfonation); however, the invention has no particular limitation thereto. The hyper-branched polymer could be modified first, and then interpenetrated with linear ionomer to form a modified interpenetrating polymer. In another embodiment, the hyper-branched polymer is modified first by adding sodium 4-vinylbenzenesulfonate (i.e. the sulfonic compound) in the solution containing the hyper-branched polymer and heated to 100° C., for grafting sodium 4-vinylbenzenesulfonate on parts of the chain ends of the hyper-branched polymer for modification. Subsequently, the modified hyper-branched polymer is added to the Nafion DMAc solution, so that the modified hyper-branched polymer and Nafion (sulfonated tetrafluorethylene copolymer) are interpenetrated each other to form an interpenetrating polymer, thereby forming a modified structure as provided in Example. Therefore, the step of modification could be optionally performed before or after forming the interpenetrating polymer, as long as the interpenetrating structure with the modified hyper-branched polymer can be obtained.

Several experiments and results are provided below for describing the physical characteristics of the modified proton exchange membrane according to the embodiment of the invention. However, the following experiments and results are provided for illustrative purposes only and are in no way intended to limit the scope of the present invention.

Experiments of Dimensional Stability

Figure 2:
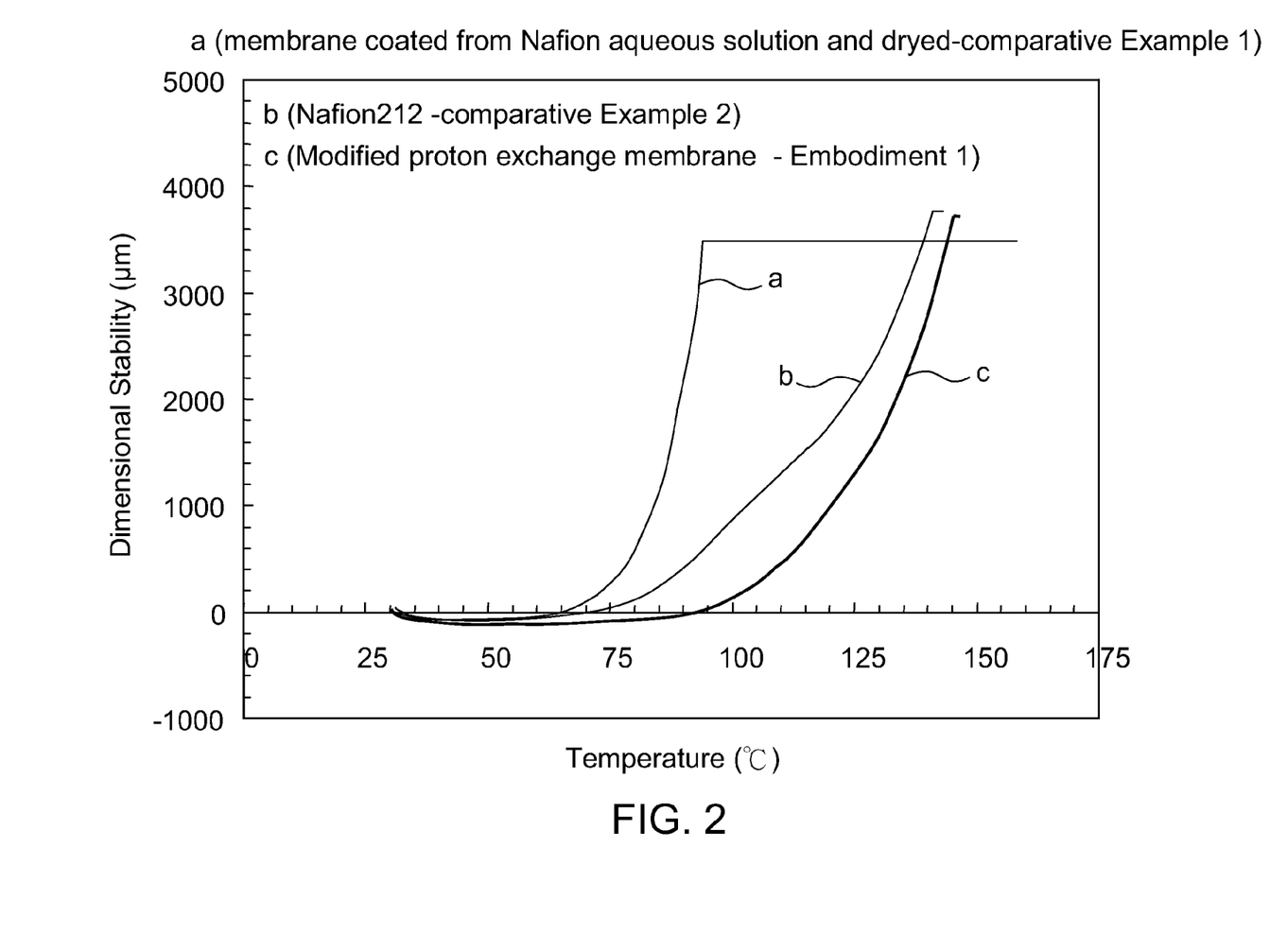
FIG. 2 is a graphic depiction showing the relationships of the dimensional stability to the temperature, obtained from the proton exchange membranes of the comparative examples and that of the embodiment 1.

FIG. 2 is a graphic depiction showing the relationships of the dimensional stability to the temperature, obtained from the proton exchange membranes of the comparative examples and that of the embodiment 1. The curves a, b and c represent the proton exchange membranes of comparative example 1 and 2, and embodiment 1, respectively. Also, the proton exchange membrane of comparative example 1 (represented by the curve a) is prepared by drying the coating film of a Nafion aqueous solution, and the proton exchange membrane of comparative example 2 (represented by the curve b) is Nafion212 available from the commercial market.

Comparative Example 1

30 g of a Nafion aqueous solution (purchased from DE2020CS of DuPont) was added to 18 g of DMAc solution, and then heated in a water bath of about 60° C. to replace water and alcohol of the Nafion solution with DMAc. The Nafion solution with DMAc was directly coated on the substrate, followed by drying and pre-treating to remove the DMAc residue. A proton exchange membrane of the comparative example 1 with a size of 10 cm×10 cm×0.003 cm is thereby formed. The glass transition temperature and the conductivity of the proton exchange membrane in the comparative example 1 are about 74° C. and 9×10-2 S/cm, respectively. The curve has indicated the size change versus the temperature of the proton exchange membrane in the comparative example 1.

Comparative Example 2

A proton exchange membrane, Nafion212, directly available from the commercial market, was used as the membrane in the comparative example 2. The solvent residue of the proton exchange membrane was removed by subjecting the membrane to $H_2O$, 3% $H_2O_2$, $H_2O$, 0.5M $H_2SO_4$ and $H_2O$ at 80° C. for about an hour, respectively. A proton exchange membrane of the comparative example 2 with a size of 10 cm×10 cm×0.005 cm is thereby formed. The glass transition temperature and the conductivity of the proton exchange membrane in the comparative example 2 are about 84° C. and $6.1 \times 10^{-2}$ S/cm, respectively. The size change versus the temperature of the proton exchange membrane in the comparative example 2 is represented by the curve b.

Embodiment 1

16.97 g of BMI (bismaleimide, as represented in the formula (3)) and 3.3033 of barbituric acid were added into 100 g of γ-butyrolactone, and then heated at 130° C. for about 4.5 hours to form a hyper-branched polymer.

(3)

30 g of a Nafion aqueous solution (DE2020CS, commercially available from DuPont) was added to 18 g of DMAc solution, and then heated in a water bath at 60° C. to replace the water and alcohol of Nafion aqueous solution with DMAc.

The hyper-branched polymer as described above was added to the Nafion DMAc solution, and the mixture is stood still and heated to about 50° C. for 48 hours to form a solution containing the inter-penetrating polymer.

Subsequently, 0.5, by weight, of sodium 4-vinylbenzenesulfonate (i.e. the sulfonic compound having double bonds) was added to 99.5, by weight, of the solution of interpenetrating polymer, and stood still on the bench at the room temperature for about 24 hours, for grafting sodium 4-vinylbenzenesulfonate on parts of the chain ends of the hyperbranched polymer for modification. Then, sodium ions (Na+) of this solution containing interpenetrating modified hyperbranched polymer are replaced by hydrogen ions (H+) using the sulfuric acid treatment.

(sodium 4-vinylbenzenesulfonate)

Afterward, the solution containing interpenetrating modified hyper-branched polymer is coated on the surface of a substrate, and baked at 130° C. to remove most of the solvent (DMAc). Then, the film is removed from the substrate, and pre-treated to remove the DMAc residue by immersing the film in the water, 3% $H_2O_2$, $H_2O$, 0.5M $H_2SO_4$ and $H_2O$ for about an hour, respectively. A proton exchange membrane of the embodiment 1 with a size of 10 cm×10 cm×0.003 cm is thereby formed. The glass transition temperature and the conductivity of the proton exchange membrane in the embodiment 1 are about 104° C. and $6.3 \times 10^{-2}$ S/cm, respectively. The size change versus the temperature of the proton exchange membrane in the embodiment 1 is represented by the curve c.

The results of FIG. 2 have shown that the proton exchange membranes of the comparative examples 1, 2 and the embodiment 1 have different dimensional stabilities. It has clearly indicated that the modified proton exchange membrane (the embodiment 1) has better dimensional stability than Nafion212 commercially available from DuPont (comparative example 2).

Experiments of Conductivity

Figure 3:
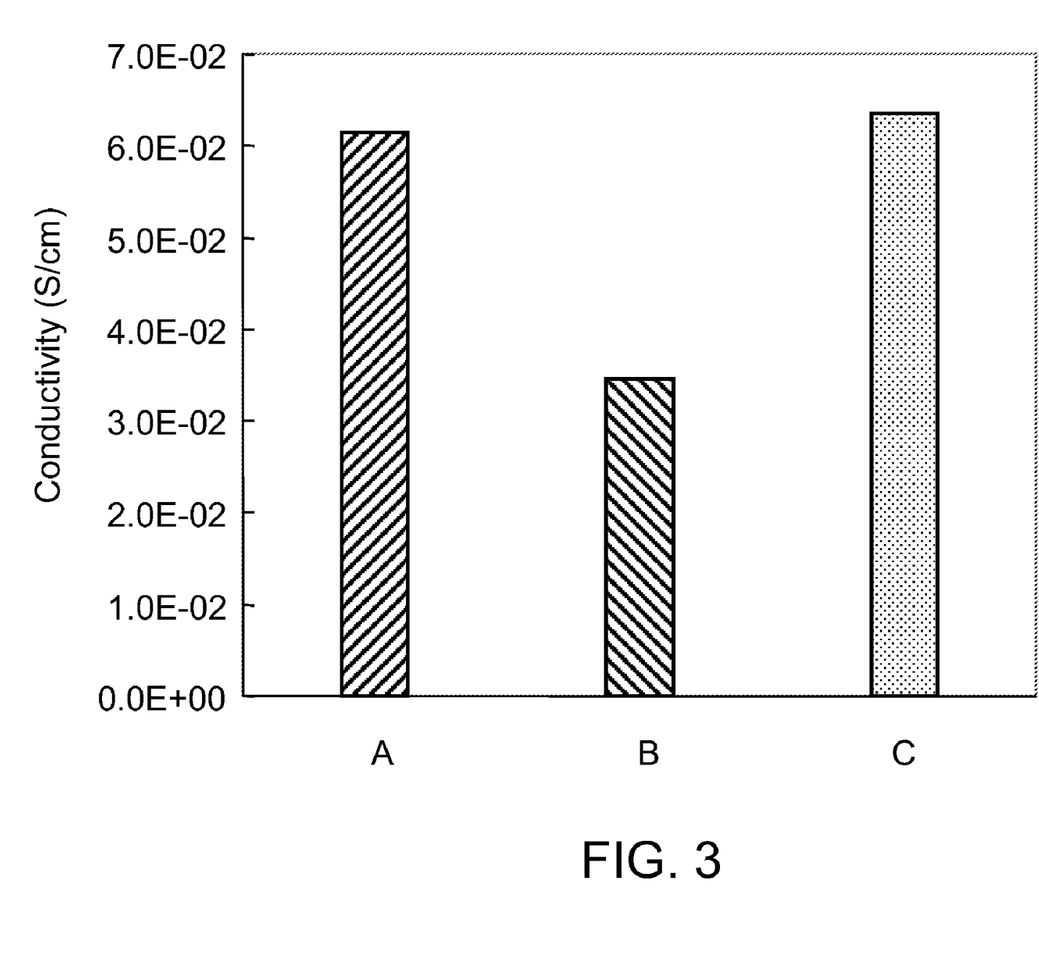
FIG. 3 is a bar graphs showing the conductivities of the proton exchange membranes made of different materials, and the conductivities are measured at the room temperature and 100% of relative humidity.

FIG. 3 is a bar graphs showing the conductivities of the proton exchange membranes made of different materials, and the conductivities are measured at the room temperature and 100% of relative humidity.

As shown in FIG. 3, the rectangular bar A represents the conductivity of the proton exchange membrane Nafion212 commercially available from DuPont, and the value is $6.1 \times 10^{-2}$ S/cm. The rectangular bar B represents the conductivity of the proton exchange membrane manufactured using a solution containing 10, by weight, of the hyper-branched polymer and 90 by weight, of the sulfonated tetrafluorethylene copolymer aqueous solution, and the value is $3.5 \times 10^{-2}$ S/cm. The rectangular bar C represents the conductivity of the proton exchange membrane manufactured using a solution containing 99.5 by weight, of the interpenetrating polymer (interpenetrated by the hyper-branched polymer and the linear ionomer) and 0.5, by weight, of the sodium 4-vinylbenzenesulfonate (sulfonating the chain ends of the hyper-branched polymer for modification), and the value of the conductivity is $6.3 \times 10^{-2}$ S/cm.

The results of FIG. 3 have indicated that the unmodified proton exchange membrane (represented by the bar B) has lower conductivity than the commercially available membrane Nafion212 from DuPont (represented by the bar A). Moreover, the bar chart of FIG. 3 has provided the significant information that the modified proton exchange membrane (represented by the bar C) manufactured according to the embodiment of the invention has higher conductivity than Nafion212 (represented by the bar A).

Experiments of Conductivity Versus Relative Humidity

Figure 4:
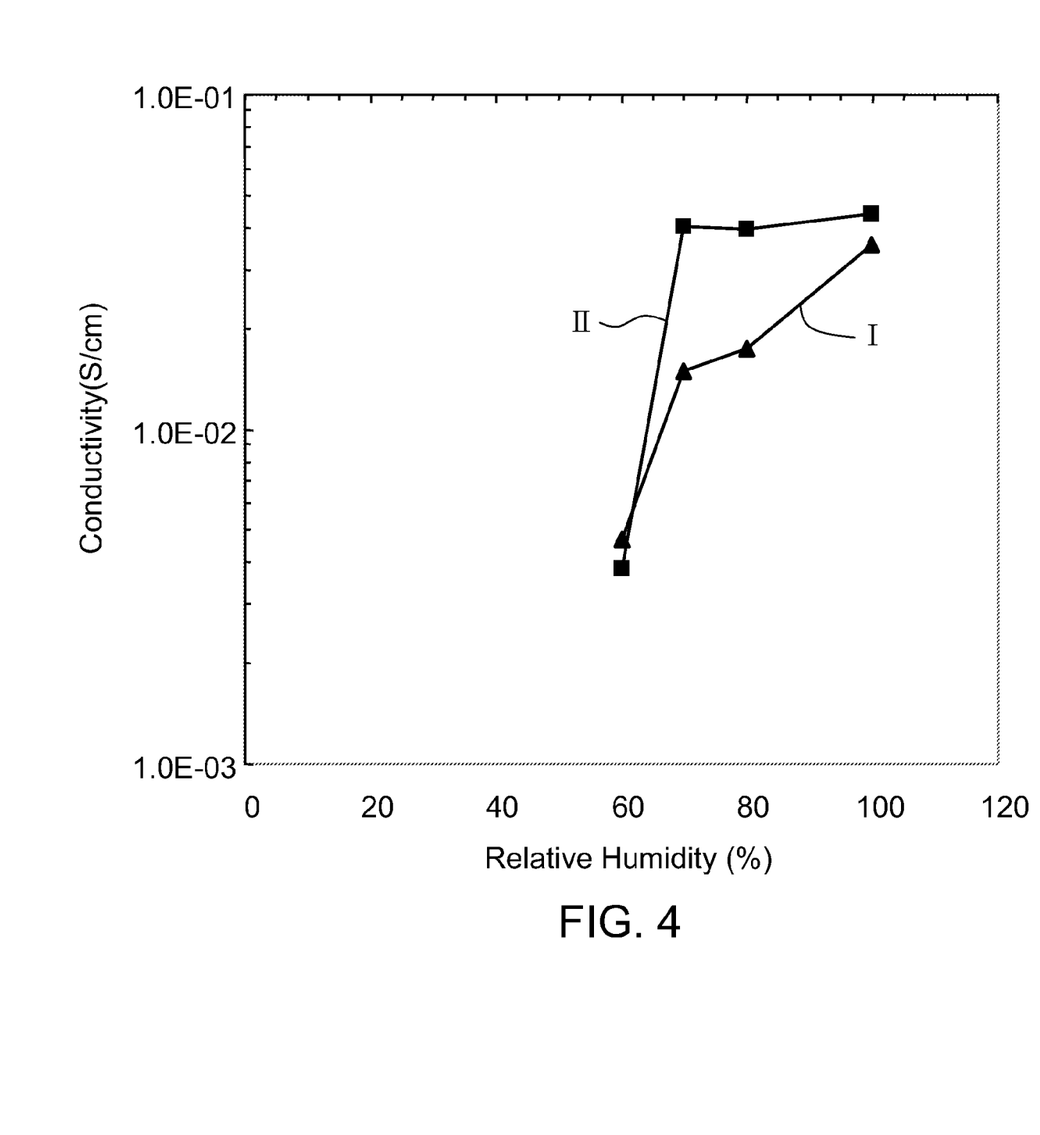
FIG. 4 is a graphic depiction showing the relationships of the conductivity to the relative humidity, obtained from the commercially available membrane Nafion212 (represented by curve I) and the modified proton exchange membrane (represented by curve II) manufactured according to the embodiment of the invention.

FIG. 4 is a graphic depiction showing the relationships of the conductivity to the relative humidity, obtained from the commercially available membrane Nafion212 (represented by curve I) and the modified proton exchange membrane (represented by curve II) manufactured according to the embodiment of the invention. The conductivities of Nafion212 and the modified proton exchange membrane of the embodiment at 60%, 70%, 80% and 100% of relative humidity (RH) can be observed from the curve I and curve II, respectively. Curve I and Curve II exhibit different behaviors.

The results of FIG. 4 show that the conductivity of the modified proton exchange membrane is higher than that of the commercially available membrane Nafion212 while the membranes are performed at 100% of RH. The conductivity of Nafion212 is apparently declined with the decrease of RH. However, the modified proton exchange membrane manufactured according to the embodiment of the invention still exhibits significantly excellent conductivities at 80% and 70% of RH, which are much higher than the conductivities of Nafion212 at 80% and 70% of RH. This means that the proton transporting rate of the modified proton exchange membrane is still high when the relative humidity is decreased to 70%.

According to the aforementioned description, the modified proton exchange membrane is manufactured through the sulfonation on the chain ends of the hyper-branched polymer, for enhancing the proton transporting rate of the membrane. The relative experimental results have indicated that the modified proton exchange membrane manufactured according to the embodiment of the invention exhibits the characteristics of excellent dimensional stability and significantly high proton transporting rate at the low humidity.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A modified hyper-branched polymer, comprising a bismaleimide (BMI)-based hyper branched polymer, and parts of the chain ends of the BMI-based hyper branched polymer being sulfonated by a monomer with sulfonate (SO3—) and haying double bonds for forming the modified hyper-branched polymer.

2. The modified hyper-branched polymer according to claim 1, wherein the sulfonic compound with double bonds is represented by the formula:

wherein R is selected from the group consisting of —(CH2)x-, —(C6H4)-, —(C6H4)-(CH2)x-(C6H4)-, —CH2-(C6H4)-CH2- and —CH2-(CF2)-CH2-, x is an integer equal or larger than 1.

3. The modified hyper-branched polymer according to claim 2, wherein the sulfonic compound with double bonds is sodium 4-vinylbenzenesulfonate, represented by the formula:

4. The p modified hyper-branched polymer according to claim 1, wherein the sulfonic compound with double bonds is represented by the formula:

wherein R is selected from the group consisting of —(CH2)x-, —(C6H4)-, —(C6H4)-(CH2)x-(C6H4), —CH2-(C6H4)-CH2- and —CH2-(CF2-CH2-, x is an integer equal or larger than 1.

5. The modified hyper-branched polymer according to claim 1, wherein the sulfonic compound with double bonds is 2-Methyl-2-propene-1-sulfonic acid sodium slat, represented by the formula:

6. The modified hyper-branched polymer according to claim 1, wherein the modified hyper-branched polymer is formed by copolymerizing bismaleimide (BMI) and barbituric acid, wherein the BMI is represented by the formula:

wherein $R_1$ is selected from the group consisting of wherein the barbituric acid is represented by the formula:

wherein each of $R_2$ and $R_3$ independently selected from the group consisting of hydrogen, methyl, phenyl, isopropyl, isobutyl and isopentyl.

7. The modified hyper-branched polymer according to claim 6, wherein a molar ratio of the BMI to the barbituric acid is in a range of about 10:1 to 1:1.

8. A modified hyper-branched polymer-, comprising a bismaleimide (BMI)-based hyper branched polymer, and parts of the chain ends of the BMI-based hyper branched polymer being sulfonated by a monomer with sulfonate (SO3-) for forming the modified hyper-branched polymer, wherein the monomer with sulfonate is represented by the formula:

wherein R is selected from the group consisting of —(CH2)x-, —(C6H4)-, (C6H4)-(CH2)x-(C6H4)-, —CH2-(C6H4)-CH2- and —CH2-(CF2)-CH2-, x is an integer equal or larger than 1.

* * * * *